METHOD AND APPARATUS FOR EMPLOYING FLUIDS IN A CLOSED CYCLE

Filed July 30, 1962 6 Sheets-Sheet 1

INVENTOR.
Walter H. Hogan
BY Bernie A. Lipper
Attorney

INVENTOR.
Walter H. Hogan
BY
Bernie G. Lynne
Attorney

INVENTOR.
Walter H. Hogan
BY [signature]
Attorney

INVENTOR.
Walter H. Hogan
BY Bernie G. Lynne
Attorney

METHOD AND APPARATUS FOR EMPLOYING FLUIDS IN A CLOSED CYCLE

Filed July 30, 1962 6 Sheets-Sheet 5

INVENTOR.
Walter H. Hogan
BY [signature]
Attorney

METHOD AND APPARATUS FOR EMPLOYING FLUIDS IN A CLOSED CYCLE

Filed July 30, 1962 6 Sheets-Sheet 6

INVENTOR.
Walter H. Hogan
BY [signature]
Attorney

United States Patent Office 3,115,014
Patented Dec. 24, 1963

3,115,014
METHOD AND APPARATUS FOR EMPLOYING FLUIDS IN A CLOSED CYCLE

Walter H. Hogan, Wayland, Mass., assignor to Arthur D. Little, Inc., Cambridge, Mass., a corporation of Massachusetts Filed July 30, 1962, Ser. No. 213,183
18 Claims. (Cl. 62—6)

This invention relates to thermal compressors or heat engines, and more particularly to a thermal compressor of high efficiency which is flexible in design and versatile in application.

The concept of a thermal compressor is not new and a number of thermal compressors have been designed and built. However, the thermal compressors of the prior art have always suffered from an inability to achieve good efficiency, an inability due in part at least to heat losses. These heat losses are of two different kinds. The first kind are the "fixed" heat losses which are inherent in the apparatus such as heat losses to the atmosphere and heat leaks from hot to cold portions of the apparatus through unavoidable temperature gradients existing in the apparatus. The second type of heat loss is that encountered in the necessity for using heat exchangers. The heat loss experienced in the use of heat exchangers can be materially lessened by the use of regenerators, but since the efficiency of a regenerator is a function of mass flow through it, the rate at which the fluid can be transferred within the apparatus is limited if high efficiencies are to be attained.

The first type of heat loss is a function of the difference between ambient temperature and the temperatures of the hot end of the thermal compressor. It can be appreciated that when these losses amount to a major portion of the losses within the apparatus, the use of regenerators is not fully effective as it might be. But if it were possible to make the fixed losses within such an apparatus a minimum portion of the heat losses, then the advantages to be gained through the use of regenerators becomes most effective in increasing the overall efficiency of the cycle.

It is, therefore, a primary object of this invention to provide a novel method of producing compressed fluid or mechanical work, a method which achieves efficiencies greater than those heretofore possible in known apparatus. It is another object of this invention to provide a method of the character described which, by reducing fixed heat losses, makes it possible to gain the maximum advantage from the use of regenerators. It is yet another object of this invention to provide a method of the character described which is flexible in application in that it can be used as a source of compressed fluid or as a source of mechanical energy, or with some modification as a refrigerator.

It is another primary object of this invention to provide a thermal compressor or heat engine which can deliver compressed fluid or mechanical energy efficiently. It is another object to provide apparatus of the character described which minimizes fixed heat losses and thus makes it possible to obtain the maximum efficiency from regenerators. It is another object to provide apparatus of this character which can be made in small sizes, which is flexible in design, which can be operated directly on a fuel, and which is versatile in its application. Other objects of the invention will in part be obvious and will in part be apparent hereinafter.

The invention accordingly comprises the several steps and the relation of one or more such steps with respect to each of the others, and the apparatus embodying features of construction, combination of elements and arrangement of parts which are adapted to effect such steps all as exemplified in the following detailed disclosure. The scope of the invention will be indicated in the claims.

The method of this invention may be briefly described as comprising the steps of transferring cold fluid from a first enclosed space to a second enclosed space and heating the fluid during this transfer to cause an increase in pressure and to deliver high-pressure fluid from the first space externally, while simultaneously transferring hot fluid from a third enclosed space to a fourth enclosed space and cooling the fluid during this transfer to cause a decrease in fluid pressure and receiving low-pressure fluid in the fourth enclosed space. The second step of the cycle is the reverse of the first, namely the transferring of cold fluid from the fourth enclosed space to the third enclosed space and heating the fluid during the transfer to cause an increase in pressure and deliver high-pressure fluid from the fourth space externally, while simultaneously transferring hot fluid from the second enclosed space to the first enclosed space and cooling the fluid during transfer to cause a decrease in fluid pressure in receiving low-pressure fluid into the first enclosed space. As will be apparent in the following detailed description, the method of this apparatus makes it possible to deliver work essentially continuously from the cycle.

The apparatus of this invention may be described as comprising a hot chamber, a first cold chamber, and a second cold chamber all of which have pistons operable within them. The pistons are mechanically joined and in their moving define within the hot and first cold chambers upper and lower subchambers, and within the second cold chamber two subchambers. The volumes of all of the subchambers are varied from essentially zero to the volume of the chamber, and in a modification of this apparatus, the two cold chambers may be combined as one. A first passage means is provided to join the upper subchamber of the hot chamber with the lower subchamber of the first cold chamber and one subchamber of the second cold chamber. A second passage means is provided to join the lower subchamber of the hot chamber with the upper subchamber of the first cold chamber at the other subchamber of the second cold chamber. Located in and associated with each of these passages are heat rejection means, thermal heat storage means and heat addition means.

If the two cold chambers are combined then the first and second passage means will, of course, communicate only between the upper subchamber of the hot chamber and lower subchamber of the cold chamber, and between the lower subchamber of the hot chamber and the upper subchamber of the cold chamber, respectively.

For a fuller understanding of the nature and objects of the invention, reference should be had to the following detailed description taken in connection with the accompanying drawings in which.

Figures 1, 2:
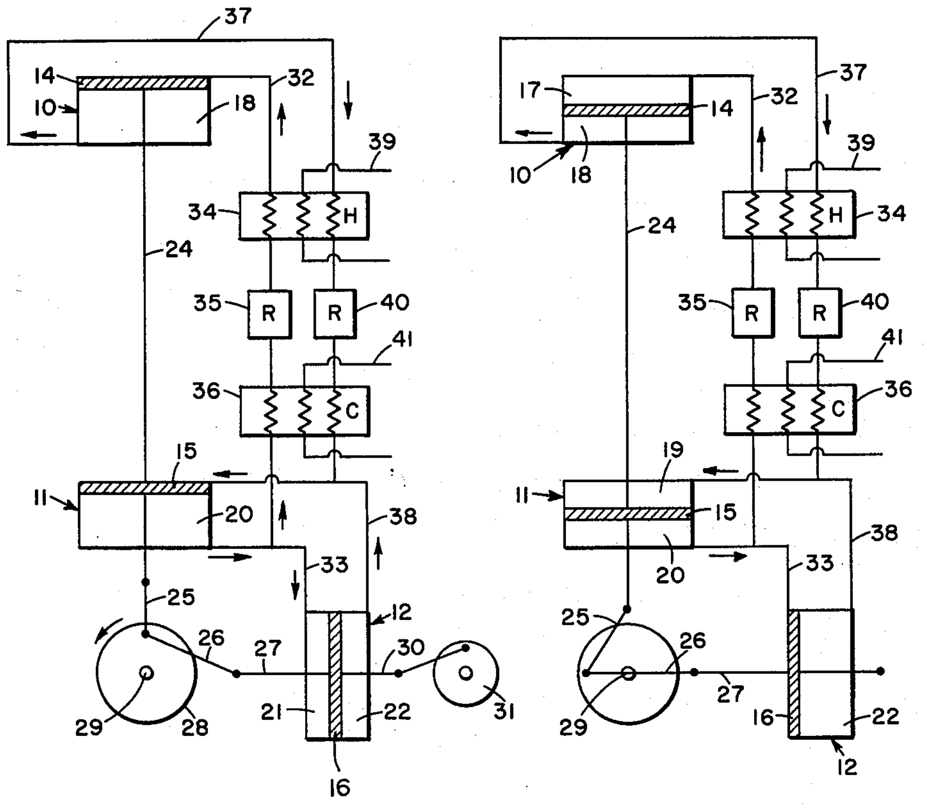
FIGS. 1–4 are simplified diagrammatic views of the apparatus of this invention illustrating the steps in the cycle operating as a heat or work engine.
Figure 10:
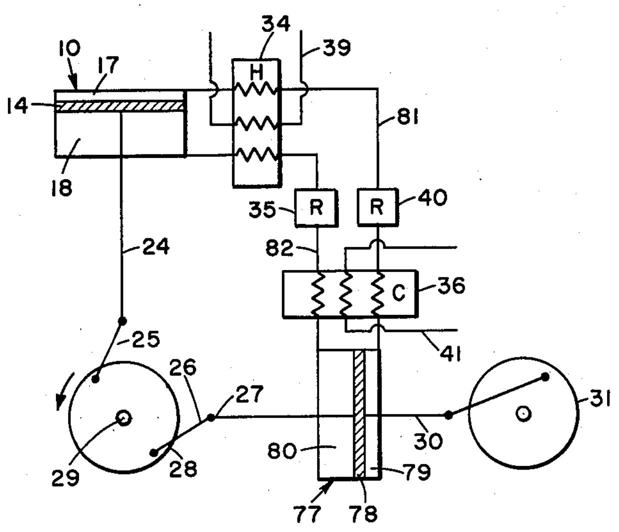
FIG. 10 is a modification of the apparatus of FIG. 1 in which the two cold chambers are combined.

FIG. 1 illustrates the use of the apparatus of this invention as a heat engine. It will be seen that there are provided three chambers 10, 11 and 12, chamber 10 being the hot chamber, chamber 11 the first cold chamber, and chamber 12 the second cold chamber from which mechanical energy is withdrawn. It will be appreciated that in the following description the terms "hot" and "cold" are relative and that the positions occupied by the chambers are illustrated as they are for convenience. Thus, it is not required that the hot chamber be on top or for that matter that the apparatus occupy a vertical position. In the description which follows, a phase angle of 90° has been shown between operating elements since this is convenient. However, it may not necessarily be the optimum angle and it is not meant to be limiting. Furthermore, although the division of the cold chamber into first cold chamber 11 and second cold chamber 12 is illustrated in FIGS. 1–4, 11, 12 and 14 as one general type of arrangement and for clarity in describing the cycle, these cold chambers may be combined as shown in FIG. 10. Finally, no attempt has been made to show relative chamber volumes since these are only design considerations.

Returning now to FIG. 1, there are located and movable within the three chambers 10, 11 and 12 pistons 14, 15 and 16, respectively. The movement of piston 14 in chamber 10 defines two subchambers: upper subchamber 17 (FIG. 2) and lower subchamber 18. The piston 15 in chamber 11 defines upper subchamber 19 (FIG. 2) and lower subchamber 20; while the piston 16 in chamber 12 defines subchambers 21 and 22. All of the pistons are mechanically connected through main shaft 24 and through connecting shaft arms 25, 26 and 27, the connection with piston 16 being made through wheel 28 which rotates on shaft 29. Finally, there is provided a drive shaft 30 and a driven member 31.

Figure 19:
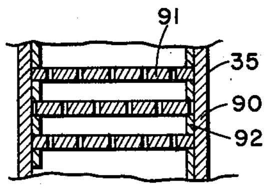
FIG. 19 illustrates a typical regenerator for use with the apparatus of this invention.

Subchamber 17 of chamber 10 and subchamber 20 of chamber 15 are joined through a passage 32, and by means of a branch passage 33 to subchamber 21 of chamber 12. Located in the passage and associated with it as integral parts are a heater 34, a regenerator 35 and a cooler 36. The heater may be any suitable apparatus for introducing thermal energy into a fluid, such as a heat exchanger suitable for circulating a hot fluid, i.e., combustion gases, in out-of-contact heat exchanger by way of conduit 39. In like manner the cooler may be a heat exchanger suitable for circulating a coolant fluid by way of conduit 41 in out-of-contact heat exchange with the fluids of the cycle. The manner in which the hot or cold heat exchange liquids are furnished is within the skill of the art and is not a part of this invention. The regenerator is typically formed of a plurality of stacked foraminous disks held in spaced relationship by means of spacers formed of a material which has a very low heat conductivity at the operating temperature of the regenerator. Diagrammatic representations of a typical regenerator are shown in FIG. 19.

In like manner, the lower subchamber 18 of chamber 10 and the upper subchamber 19 (FIG. 2) of chamber 11 are joined by main passage 37, and by branch passage 38 to subchamber 22 of chamber 12. Passage 37 also has associated with it a heater 34, regenerator 40 and cooler 36. It will be apparent from this arrangement that those portions of passages 32 and 37 which are part of heater 34 and cooler 36 are thermally bonded to each other. This contributes to the thermal efficiency of the cycle.

It will be seen in FIGS. 1–4 that the apparatus can in fact be divided into two halves or sections. The first half is made up of subchambers 17, 20 and 21 while the second half is made up of subchambers 18, 19 and 22. The fluid flow in these halves, and hence their operation, is 180° out of phase making two cycles to each revolution of the wheel 28, and effecting two different operations simultaneously in each cycle step.

In describing the cycle the flow of the fluids will be described as illustrated in FIGS. 1–4 as well as the thermodynamic processes as illustrated in FIGS. 5–9. Therefore, reference should be made to all of these drawings in the following description.

To begin the cycle it will be assumed that the conditions obtain as indicated in FIG. 1. Subchamber 18 is filled with hot high-pressure fluid while subchamber 20 is filled with cold low-pressure fluid. The first step then consists of transferring the fluid from subchamber 20 to subchamber 17 (see FIG. 2) and in the process pressurizing it by heating. Heating is done in three different steps. The first is for the cold fluid to reject heat in the cooler 36 then to be warmed as it passes through regenerator 35 and finally to receive heat in heater 34. Thus the fluid entering subchamber 17 (FIG. 2) is hot and at an increasing pressure. Likewise as the pistons 14 and 15 move downwardly as indicated in FIG. 2, the fluid in subchamber 20 is pressurized. At the same time, the high-pressure fluid which had filled subchamber 18 is forced out and downwardly as indicated by the arrows. Thus fluid in its return through passage 37 is cooled and hence reduced in pressure so that when it enters subchamber 19 it enters as cold low-pressure fluid. With the downward movement of pistons 14 and 15 the wheel 28 is given rotational motion in the direction of the arrow shown. In doing this the displacer 16 is moved within chamber 12 such that the volume in subchamber 21 is essentially zero while that in subchamber 22 is equivalent to the total volume of chamber 12.

Figure 3:
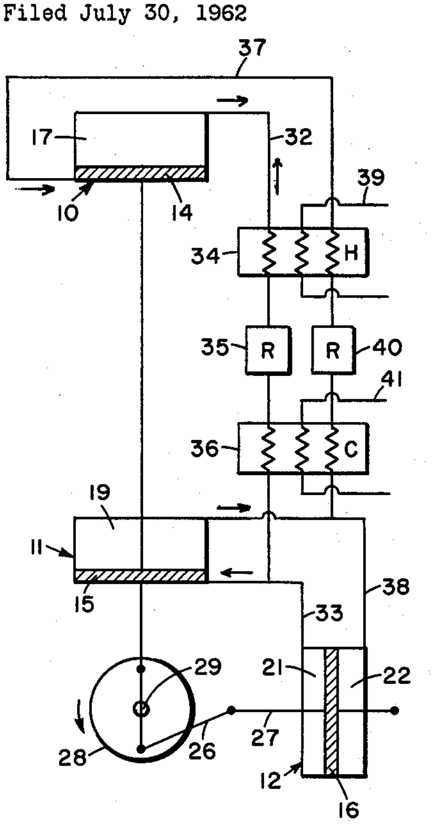
Figure 4:
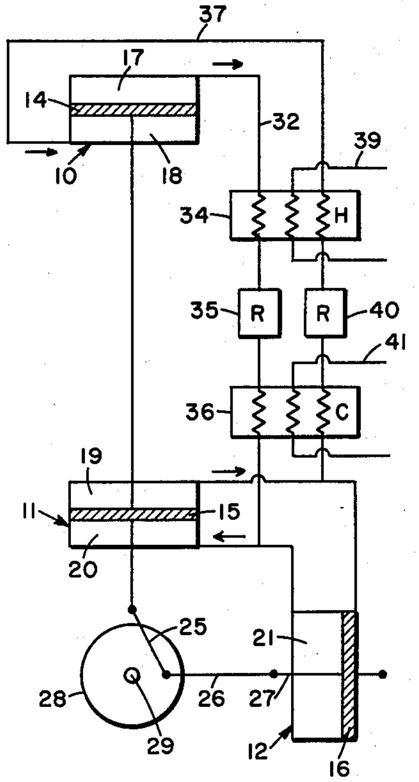

Turning now to FIGS. 3 and 4 it will be seen that the second step in the cycle is a reversal of the first step. That is, hot high-pressure fluid in subchamber 17 is forced out and downwardly as indicated by the arrow, and passes first through the heater, then the regenerator and then the cooler and enters subchamber 20 as cold low-temperature fluid by virtue of the fact that this pressure has been considerably decreased in the cooling process. Simultaneously with this, the cold low-pressure fluid in subchamber 19 is transferred upwardly through the cooler, regenerator and heater and enters subchamber 18 to build up there as high-pressure fluid.

Figure 5:
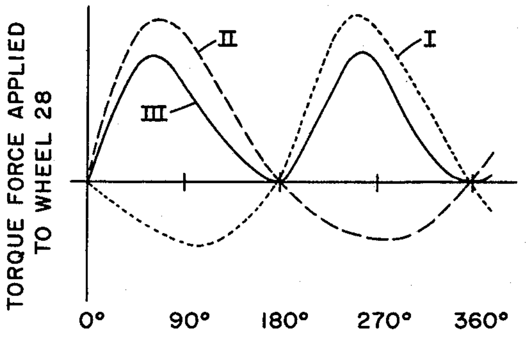
FIG. 5 is a plot of the work output of the cycle of FIGS. 1–4 in terms of torque on a drive wheel.

In FIG. 5 the performance of the apparatus is plotted in terms of the torque force applied to the wheel 28 or to the wheel 31. In this figure the solid line represents the total work output of the cycle, while the dotted and dashed lines represent the two sides or two halves of the cycle. The dotted line curve I represents the cycle concerned with subchambers 17, 20 and 21 and reflects the pressure fluctuations in the fluid in subchamber 21 and hence the torque force applied to wheel 28. Starting with the position illustrated in FIG. 4 it may be shown that the volume of subchamber 21 is at a maximum while pressure is at a minimum. With decreasing volume and increasing pressure the torque decreases. Therefore in accordance with standard practice a negative torque indicates a torque opposing the direction of motion. Then with the situation reversed the torque rapidly increases moving the wheel in the direction indicated. Simultaneously subchamber 22 is experiencing the exact opposite from subchamber 21 in pressure fluctuations and hence the torque force applied is that shown in curve II of FIG. 5. The net torque applied to wheel 28 is, of course, the sum of the two individual torque forces, i.e., curve III which is the solid line. The cycle may be so timed that at no time does it experience a net negative torque.

Figure 6:
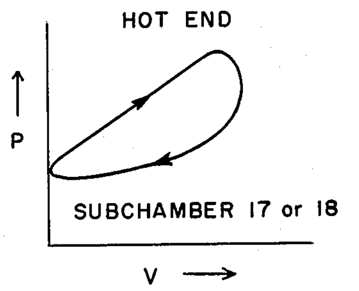
FIGS. 6–9 are indicator diagrams for the various volumes of the apparatus of FIGS. 1–4.
Figure 7:
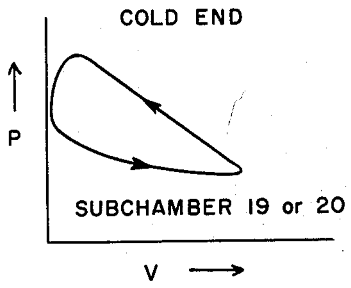

The manner in which the apparatus of this invention delivers external work may be further illustrated with reference to FIGS. 6–9. Since the volume, V, is the actual subchamber volume the diagrams of FIGS. 6–9 may be considered as indicator diagrams. FIG. 6 is therefore the indicator diagram for either of the two subchambers (17 and 18) making up the hot end. The clockwise direction indicated means, of course, that the fluid in the hot subchamber has done work and therefore lost enthalpy which can and is restored by adding heat in the heaters 34 and 39. FIG. 7 in turn is the indicator diagram for either of the two subchambers (19 and 20) making up the cold end. It is, of course, identical in size but opposite in direction to that of FIG. 6. The counterclockwise direction of FIG. 7 indicates absorption of work and therefore a gain in enthalpy. This enthalpy gain is subsequently lost by extracting heat from the fluid, by cooling it in coolers 36 and 41. Thus the work done by the fluid in subchamber 17 (or 18) is exactly balanced by the work absorbed by the fluid in subchamber 20 (or 19).

Figure 8:
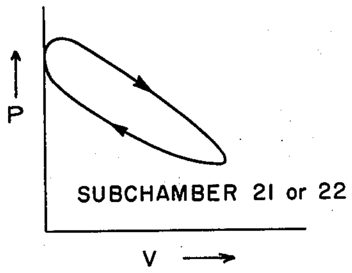
Figure 9:
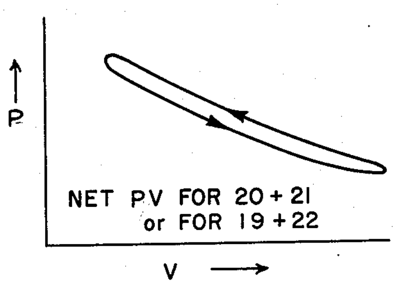

FIG. 8 is the indicator diagram for subchamber 21 (or 22) and therefore illustrates the work done by the fluid in that subchamber (or subchamber 22) on piston 16. It is this work which is available externally in the form of torque force. The efficiency of the cycle is then the ratio of the area of FIG. 6 (heat in) to the area of FIG. 8 (work out). The physical connection between subchambers 20 and 21 means that there is mixing of the fluids in each. In delivering external work the fluid in subchamber 21 is cooled while the fluid in space 20 is heated during compression. In mixing these it is necessary to reject heat to restore the original enthalpy of the working fluid. This is shown in FIG. 9 which represents the quantity of heat which must be removed. Finally, in order to establish a heat balance, the sum of the areas of FIGS. 8 and 9 must equal the area of FIG. 6—that is, work out plus heat out must equal the energy (heat) put into the system. It will be appreciated that the actual work out will be less than the ideal quantity because of heat losses due to friction, heat transfer, and the like.

As pointed out above, in connection with FIGS. 1–4, chambers 11 and 12 can be combined since they operate at essentially the same temperature. This arrangement is illustrated in FIG. 10 wherein chamber 77 is equivalent to combined chambers 11 and 12. A single piston 78 divides chamber 77 into subchambers 80 and 79 and the latter being equivalent to a combination of subchambers 20 and 21. The phase angle between the motion of piston 14 in chamber 10 and the piston 78 in chamber 77 is set to give the necessary equivalent variations of the hot and cold end volumes. The passages 81 and 82 of FIG. 10 are, of course, equivalent to the combination of passages 32 with 33 and 37 with 38 (FIG. 1), respectively. It is evident from an examination of FIG. 10 that when work is put into the cycle instead of taken out as previously described, heat can be moved from the cold end up to the hot end, thus the direction of heat and work flow is reversed and there is provided a refrigeration system.

In its broader sense, then, the process of this invention is one of circulating a fluid within an enclosed, steady state system with either the introduction of heat energy and the delivery of work, or the introduction of work energy and the delivery of refrigeration. In the first case the apparatus is a heat engine or a thermal compressor, while in the second case it is a refrigerator. The method or cycle may then be looked upon as involving first and fourth enclosed spaces forming a single cold zone the total volume of which remains constant, with the volumes of each of the first and fourth spaces varying during the cycle from essentially zero to the total volume of the cold zone; and the second and third enclosed spaces forming a single hot zone the total volume of which remains constant, with the volumes of each of the second and third spaces varying during the cycle from essentially zero to the total volume of the hot zone. These volumes are identifiable in the drawings (e.g. FIGS. 1–4 and 10) as follows: first volume, subchambers 20 plus 21 or 80; second volume, subchamber 17; third volume, subchamber 18, and fourth volume subchambers 19 plus 22 or 79. Further, it will be seen that the first and second volumes (or their corresponding subchambers) make up a first side of the cycle having a first quantity of circulating fluid, which is not in fluid communication with the third and fourth volumes (or their corresponding subchambers) which make up a second side of the cycle having a second quantity of circulating fluid.

Given these volumes maintained at different temperatures and their attendant enclosed spaces, the cycle becomes one of effecting changes in the pressures of the fluids, either increasing or decreasing them. To begin (in this case with FIG. 3) a change is effected in the pressure of the first quantity of fluid occupying the first and second spaces by increasing the volume of the first space, while simultaneously a first change is effected in the pressure of the second quantity of fluid (opposite to that effected in the first quantity) occupying the third and fourth enclosed spaces by decreasing the volume in the fourth space. The second step consists of effecting a second change (which may or may not be in the same direction as the first step) in the pressure of the first quantity of fluid by increasing the volume of the second space, while simultaneously effecting a second change in the pressure of the second quantity of fluid opposite to that effected in the first quantity by decreasing the volume of the third space.

The third step is in effect a reversal of the first step. In this step it is necessary to effect a third change in pressure of the first quantity of fluid by decreasing the volume of the first space, while simultaneously effecting a third change in pressure in the second quantity of the fluid opposite to that effected in the first quantity by increasing the volume of the fourth enclosed space. Finally, the fourth step is a reversal of the second step and consists of effecting a fourth change in the pressure in the first quantity of fluid by decreasing the volume of the second space while simultaneously effecting a fourth change in pressure of the second quantity of the fluid opposite to that effected in the first quantity by increasing the volume of the third space.

In the cycle just described the mean pressures in the first quantity of fluid occupying the first space and the second quantity of fluid occupying the fourth space are different when the first and fourth spaces are increasing in volume from that when the first and fourth spaces are decreasing in volume. Likewise, the mean pressures in the first quantity of fluid occupying the second space and the second quantity of fluid occupying the third space are different when the second and third spaces are increasing in volume than when the second and third spaces are decreasing in volume.

A further thermodynamic analysis of this broadly defined cycle will show that when the mean pressures in the first quantity of fluid occupying the first space and in the second quantity of fluid occupying the fourth space are greater when the first and fourth spaces are increasing in volume than when the first and fourth spaces are decreasing in volume, and the mean pressures in the first quantity of fluid occupying the second space and in the second quantity of fluid occupying the third space are less when the second and third spaces are increasing in volume than when the second and third spaces are decreasing in volume, work will be delivered external of the system and the apparatus performing the cycle will be a heat engine or a thermal compressor.

In like manner, it may be shown that when the mean pressures in the first quantity of fluid occupying the first space and in the second quantity of fluid occupying the the fourth space are lower when the first and fourth spaces are increasing in volume than when the first and fourth spaces are decreasing in volume, and the mean pressures in the first quantity of fluid occupying the second space and in the second quantity of fluid occupying the third spaces are greater when the second and third spaces are increasing in volume than when the second and third spaces are decreasing in volume then refrigeration is delivered external of the system and the apparatus performing the cycle is a refrigerator.

Figure 11:
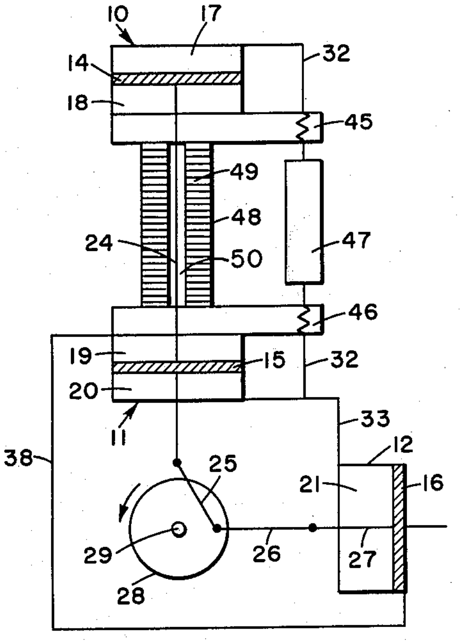
FIG. 11 is a modification of the apparatus of FIG. 1.

FIG. 11 illustrates another modification of the apparatus of FIG. 1. It will be seen that in this figure the coolers, regenerators and heaters have taken a different form. The heater 34 of the apparatus of FIG. 1 is replaced in the apparatus of FIG. 11 by a heat station 45 which is thermally bonded to the wall of the hot chamber 10. Likewise, the cooler 36 of the apparatus of FIG. 1 has been replaced by a heat station 46 bonded in thermal contact with the wall of the cold chamber 11. The two regenerators 35 and 40 have been replaced with two different types of regenerators. The first of these is regenerator 47 of a conventional type which is a part of and associated with the main passage 32. The second regenerator 48 is in effect the passage between the lower subchamber 18 of the chamber 10 and the upper subchamber 19 of chamber 11. Thus, passage 37 of FIG. 1 has been eliminated and regenerator 48 serves in its place. This regenerator is conveniently formed of annular shaped foraminous disks which are held in spaced relationship by an insulating material (not shown) which is not a heat conductor or which exhibits minimum heat conductivity over the temperature range at which the regenerator is operated. These annular disks define through the central portion of the regenerator 48 a space 50 through which the shaft 24 may move in a vertical direction.

The cycle of the apparatus of FIG. 11 is identical to that described above for the apparatus of FIGS. 1–4.

Figure 12:
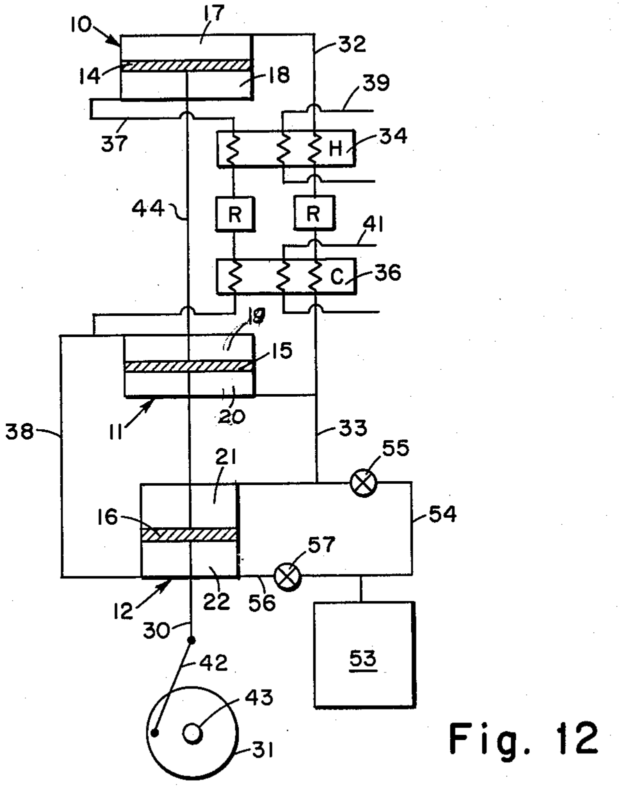
FIG. 12 is another modification of the apparatus.

The diagram of FIG. 12 illustrates another modification of the apparatus of this invention. This modification includes the use of a fluid ballast. It also eliminates the drive wheel 28. This arrangement permits the direct connection through shaft 44 of the pistons 14 and 15 with piston 16 moving vertically within chamber 12. The fluid ballast 53 is used to furnish a volume of fluid and hence, to control the the fluid pressure within the system. The volume of ballast 53 is very large compared to the volume of any one of the subchambers, so that its pressure does not vary to any appreciable extent throughout the cycle. In the cycle of FIG. 12, as the pistons 14 and 15 are moved upwardly valve 55 is open so that the pressure in chambers 17, 20 and 21 is maintained at the ballast chamber 53 pressure, while the pressure in chambers 18, 19 and 22 is increasing as fluid is displaced from the cold chamber 19 into the hot chamber 18. The net force on piston 16 is in the direction of movement.

Figure 13:
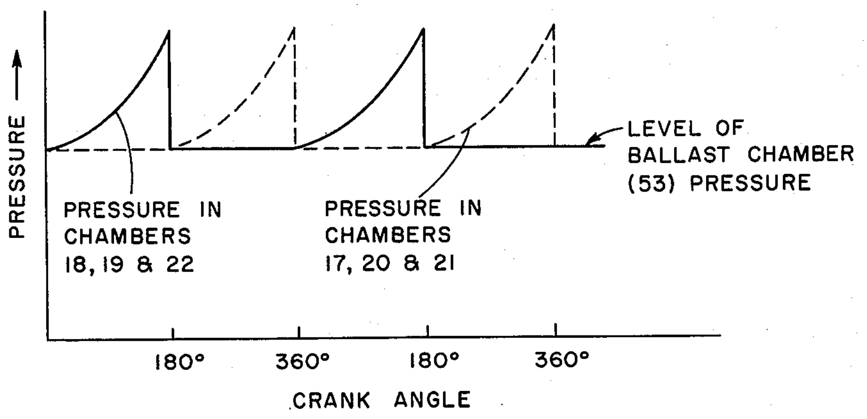
FIG. 13 is a plot of the work output of the apparatus of FIG. 12.

With the reversal of piston movement, valve 55 is closed and valve 57 is opened, thus making ballast 53 available as pressure control means for the chambers 18, 19 and 22. The output of this cycle is plotted in FIG. 13.

Figure 14:
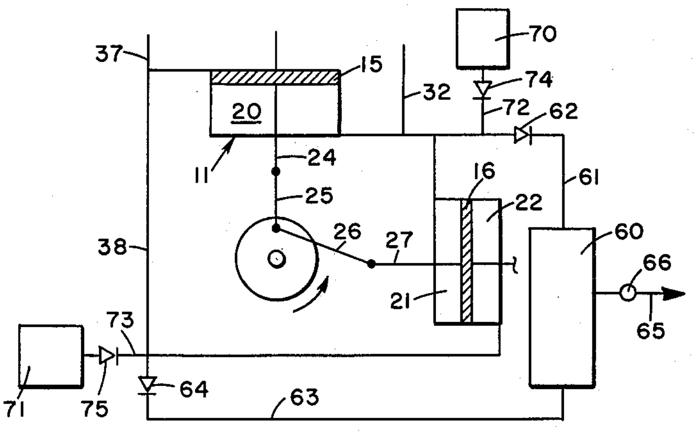
FIG. 14 is a modification of the lower portion of the apparatus of FIG. 1 showing the apparatus as a thermal compressor.
Figure 15:
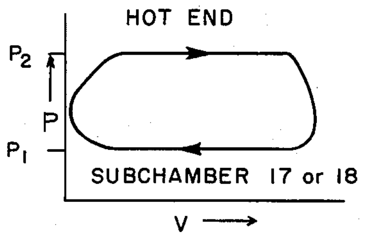
FIGS. 15–18 are indicator diagrams for the operation of the thermal compressor of FIG. 14.
Figure 16:
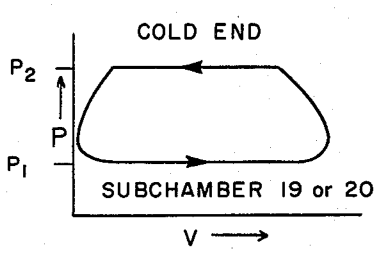
Figure 17:
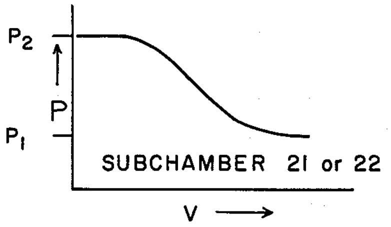

The description given above of the apparatus of this invention has been oriented to the use of this apparatus as a heat engine. This apparatus is of course equally usable as a thermal compressor to supply quantities of compressed fluids. This of course means that in place of doing mechanical work the movement of the piston 16 in chamber 12 will alternately force high-pressure fluid out of subchamber 21 and subchamber 22. An arrangement for using the apparatus as a thermal compressor is illustrated in FIG. 14 in which only the lower portion of the apparatus is illustrated. The upper portion, including the hot chamber 10, piston 14, heater 34, regenerators 35 and 40 and cooler 36 is identical to that of the apparatus of FIG. 1. As in the case of the heat engine of FIGS. 1–4, three chambers (chamber 10 not being shown) make up the thermal compressor of FIG. 14 for ease in describing the cycle. However, chambers 11 and 12 may be combined as shown in FIG. 10 as well as constituting two separate chambers as shown in FIG. 14.

In the thermal compressor of FIG. 14 there are provided compressed fluid storage means 60 and conduits 61 and 63 leading into it. Conduit 61 delivers high-pressure fluid from subchamber 21, the flow of which is controlled by one-way check valve 62; while conduit 63 delivers high-pressure fluid from subchamber 22, fluid flow being controlled by one-way check valve 64. Finally, a fluid draw-off line 65 is provided with a suitable valve 66. Since the apparatus is used to deliver compressed fluid externally, suitable fluid sources 70 and 71 must be provided. If the apparatus is used to compress air, then fluid sources 70 and 71 will normally be the atmosphere. Inlet conduits 72 and 73 and fluid flow check valves 74 and 75 are provided to complete the fluid supply system. In a like manner, of course, the apparatus of FIGS. 11 and 12 may be used as a source of compressed fluid with conduits being connected to subchambers 21 and 22 as in FIG. 14.

Indicator diagrams are given for the apparatus of FIG. 14 in FIGS. 15–18. Reference should be made to these as well as to FIG. 14 in the following description of the operation of this thermal compressor. Again as in the case of the heat engines the fluid flow in subchambers 17, 20 and 21 is approximately 180° out of phase with that in subschambers 18, 19 and 22.

In FIG. 14 the position of piston 15 indicates that subchamber 20 contains cold, low-pressure fluid, which has been delivered from subchamber 17 and which has been cooled in the transfer. As the pressure in subchambers 17, 20 and 21 drops to $P_1$ (FIG. 15) in this transfer process, fluid is brought into the system from fluid supply source 70 through line 72 and check valve 74. Thus the pressure is maintained at $P_1$. Simultaneously, with the decrease in pressure in subchambers 17, 20 and 21 there occurs an increase in pressure in subchambers 18, 19 and 22 of sufficient magnitude to open check valve 64 and deliver compressed fluid to reservoir 60. Thus the pressure in these subchambers is maintained at $P_2$. Now the cycle reverses to the extent that fluid is transferred from subchamber 20 to 17, is heated, and pressurized to $P_2$. Simultaneously, the pressure of fluid in subchambers 18, 19 and 22 decreases with fluid cooling (downward flow) and valve 75 is opened to admit fluid. With the increase in pressure to $P_2$ of the fluid in subchambers 17, 20 and 21 compressed fluid is delivered to reservoir 60 through check valve 62.

Figure 18:
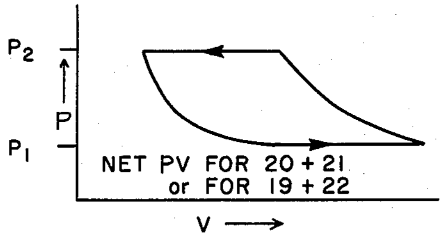

The indicator diagrams for the hot end subchambers and cold end subchambers (FIGS. 15 and 16) have equal areas but show opposite directions. This is, of course, because heat is added at the hot end and an equal amount is rejected at the cold end. The PV diagram for subchamber 21 (or 22) has no volume since neither work nor heat is available from it. The area of the diagram in FIG. 18 represents the net PV for the combination of subchambers 20 and 21 (or 19 and 22). It is of course equal to that for subchamber 20 alone and represents heat rejection, thus balancing the system thermodynamically. In the case of the thermal compressor no work crosses the "thermodynamic boundary" of the system. Fluid enters at $P_1$ and leaves at $P_2$, but at the same temperature, thus no enthalpy change is theoretically reflected in the diagrams.

The regenerators suitable for the practice of this invention are preferably constructed as illustrated in FIG. 19. There it will be seen that a regenerator consists of a housing 90 in which is located a plurality of foraminous disks 91 held in spaced relationship by any suitable spacer 92. The spacer should of course have minimum or very low heat conductivity at the temperatures at which the regenerator is operated.

It will be seen from the above description of this invention that it provides a method and apparatus which fulfils the objects set forth. By completely isolating the hot and cold portions of the cycle it is possible to minimize fixed heat losses. This reduction of fixed heat losses in turn means that flow rates within the system may be adjusted to maximize the efficiency of the regenerators. Moreover, the cycle permits the use of a greater temperature difference between hot and cold ends and the addition of heat to hot fluid and the rejection of heat from cold fluid. There is, therefore, a combination of factors which materially contribute to the attainment of thermal efficiencies higher than previously possible in thermal compressors-heat engines.

It will thus be seen that the objects set forth above, among those made apparent from the preceding description, are efficiently attained, and since certain changes may be made in carrying out the above method and in the constructions set forth without departing from the scope of the invention, it is intended that all matter contained in the above description or shown in the accompanying drawings shall be interpreted as illustrative and not in a limiting sense.

I claim:

1. Method of employing a fluid circulating wtihin an enclosed steady state system comprising the steps of (*a*) effecting a first change in the pressure of a first quantity of a fluid occupying first and second enclosed spaces by increasing the volume of said first space, while simultaneously effecting a first change in pressure of a second quantity of said fluid opposite to that effected in said first quantity occupying third and fourth enclosed spaces by decreasing the volume in said fourth space;

(*b*) effecting a second change in the pressure of said first quantity of fluid by increasing the volume of said second space, while simultaneously effecting a second change in the pressure of said second quantity of said fluid opposite to that effected in said first quantity by decreasing the volume of said third space;

(*c*) effecting a third change in pressure of said first quantity of fluid by decreasing the volume of said first space, while simultaneously effecting a third change in pressure in said second quantity of said fluid opposite to that effected in said first quantity by increasing the volume of said fourth enclosed space; and (*d*) effecting a fourth change in pressure in said first quantity of fluid by decreasing the volume of said second space while simultaneously effecting a fourth change in pressure of said second quantity of said fluid opposite to that effected in said first quantity by increasing the volume of said third space;

said effecting of all of said changes in pressure in steps (*a*)–(*d*) being accompanied by fluid flow of said first and second quantities of fluid and being accomplished through heating and cooling said first and second quantities of fluid, said heating and said cooling including the steps of releasing and storing heat during said fluid flow;

whereby the mean pressures in said first quantity of fluid occupying the said first space and in said second quantity of fluid occupying said fourth space are different when said first and fourth spaces are increasing in volume from that when said first and fourth spaces are decreasing in volume; and the mean pressures in said first quantity of fluid occupying said second space and said second quantity of fluid occupying said third space are different when said second and third spaces are increasing in volume than when said second and third spaces are decreasing in volume; said first and fourth spaces forming a single cold zone, the total volume of which remains constant, the volume of each of said first and fourth spaces varying during the cycle from essentially zero to the total volume of said cold zone; and said second and third spaces forming a single hot zone, the total volume of which remains constant, the volume of each of said second and third spaces varying during the cycle from essentially zero to the total volume of said cold zone.

2. Method in accordance with claim 1 wherein the mean pressures in said first quantity of fluid occupying said first space and in said second quantity of fluid occupying said fourth space are greater when said first and fourth spaces are increasing in volume than when said first and fourth spaces are decreasing in volume, and the mean pressures in said first quantity of fluid occupying said second space and in said second quantity of fluid occupying said third space are less when said second and third spaces are increasing in volume then when said second and third spaces are decreasing in volume; whereby work is delivered external of said system.

3. Method in accordance with claim 1 wherein the mean pressures in said first quantity of fluid occupying said first space and in said second quantity of fluid occupying said fourth space are lower when said first and fourth spaces are increasing in volume than when said first and fourth spaces are decreasing in volume, and the mean pressures in said first quantity of fluid occupying said second space and in said second quantity of fluid occupying said third space are greater when said second and third spaces are increasing in volume than when said second and third spaces are decreasing in volume; whereby refrigeration is delivered external of said system.

4. Method of extracting work from a fluid circulating within an enclosed steady state system, comprising the steps of (*a*) expanding a first quantity of fluid in first and second enclosed spaces by increasing the volume of said first space, while simultaneously compressing a second quantity of said fluid in third and fourth enclosed spaces by decreasing the volume of said fourth space;

(*b*) further expanding said first quantity of fluid by increasing the volume of said second space, while simultaneously further compressing said second quantity of said fluid by decreasing the volume of said third space;

(*c*) compressing said first quantity of fluid by decreasing the volume of said first space, while simultaneously expanding said second quantity of said fluid by increasing the volume of said fourth enclosed space; and (*d*) further compressing said first quantity of fluid by decreasing the volume of said second space, while simultaneously further expanding said second quantity of said fluid by increasing the volume of said third space;

all of said expanding and said compressing in steps (*a*)–(*d*) being accompanied by fluid flow of said first and second quantities of fluid and being effected through heating and cooling said first and second quantities of fluid, said heating and cooling including the steps of releasing and storing heat during said fluid flow;

whereby the mean pressures in said first quantity of fluid in said first space and in said second quantity of fluid in said fourth space are greater when said first and fourth spaces are increasing in volume than when said first and fourth spaces are decreasing in volume and the mean pressures in said first quantity of fluid in said second space and in said second quantity of fluid in said third space are less when said second and third spaces are increasing in volume than when said second and third spaces are decreasing in volume, thereby delivering work external of said system; said first and fourth spaces forming a single cold zone, the total volume of which remains constant, the volume of each of said first and fourth spaces varying during the cycle from essentially zero to the total volume of said cold zone; and said second and third spaces forming a single hot zone, the total volume of which remains constant, the volume of each of said second and third spaces varying during the cycle from essentially zero to the total volume of said hot zone.

5. Method of extracting refrigeration from a fluid circulating within an enclosed steady state system, comprising the steps of (*a*) compressing a first quantity of fluid in first and second enclosed spaces by increasing the volume of said first space, while simultaneously expanding a second quantity of said fluid in third and fourth enclosed spaces by decreasing the volume of said fourth space;

(*b*) further compressing said first quantity of fluid by increasing the volume of said second space, while simultaneously further expanding said second quantity of said fluid by decreasing the volume of said third space;

(*c*) expanding said first quantity of fluid by decreasing the volume of said first space, while simultaneously compressing said second quantity of said fluid by increasing the volume of said fourth enclosed space; and (*d*) further expanding said first quantity of fluid by decreasing the volume of said second space, while simultaneously further compressing said second quantity of said fluid by increasing the volume of said third space;

all of said expanding and said compressing in steps (*a*)–(*d*) being accompanied by fluid flow of said first and second quantities of fluid and being effected through heating and cooling said first and second quantities of fluid, said heating and cooling including the steps of releasing and storing heat during said fluid flow;

whereby the mean pressures in said first quantity of fluid in said first space and in said second quantity of fluid in said fourth space are less when said first and fourth spaces are increasing in volume than when said first and fourth spaces are decreasing in volume, and the mean pressures in said first quantity of fluid in said second space and in said second quantity of fluid in said third space are greater when said second and third spaces are increasing in volume than when said second and third spaces are decreasing in volume, thereby delivering refrigeration external of said system;

said first and fourth spaces forming a single cold zone, the total volume of which remains constant, the volume of each of said first and fourth spaces varying during the cycle from essentially zero to the total volume of said cold zone; and said second and third spaces forming a single hot zone, the total volume of which remains constant, the volume of each of said second and third spaces varying during the cycle from essentially zero to the total volume of said hot zone.

6. Method of extracting work from a fluid circulating within an enclosed system, comprising the steps of (*a*) transferring a first quantity of cold fluid from a first enclosed space to a second enclosed space and heating said fluid during transfer thereby to cause an increase in pressure and to deliver energy externally, while simultaneously transferring a second quantity of hot fluid from a third enclosed space to a fourth enclosed space and cooling said fluid during transfer thereby to cause a decrease in fluid pressure and to deliver cold low-pressure fluid into said fourth space; and (*b*) transferring said cold low-pressure fluid in said fourth enclosed space to said third enclosed space and heating said fluid during transfer thereby to cause an increase in pressure and to deliver energy externally, while simultaneously transferring hot fluid from said second enclosed space to said first enclosed space and cooling said fluid during transfer thereby to cause a decrease in fluid pressure and to deliver cold low-pressure fluid into said first space preparatory for step (*a*);

said heating in steps (*a*) and (*b*) comprising in order the steps of rejecting heat to an external heat transfer fluid, exchanging heat with that previously stored during transfer of said hot fluid, and receiving heat from an external heat transfer fluid; said cooling in steps (*a*) and (*b*) comprising in order the steps of exchanging heat with an external heat transfer fluid, storing the heat thus acquired for heat exchange with said cold fluid during its transfer, and rejecting heat to an external heat transfer fluid;

said first and fourth spaces forming a single cold zone, the total volume of which remains constant, the volume of each of said first and fourth spaces varying during the cycle from essentially zero to the total volume of said cold zone; and said second and third spaces forming a single hot zone, the total volume of which remains constant, the volume of each of said second and third spaces varying during the cycle from essentially zero to the total volume of said hot zone.

7. Method in accordance with claim 6 further characterized by the step of controlling the pressures of said first and second quantities of fluid during their transfer to said second and third enclosed spaces.

8. Method in accordance with claim 7 wherein said controlling of said pressures comprises exhausting said fluids into a fluid ballast, the volume of which is large compared to the volumes of said hot and cold zones.

9. Method of extracting work from a fluid circulating within an enclosed system, comprising the steps of (*a*) transferring a first quantity of cold fluid from a first enclosed space to a second enclosed space and heating said fluid during transfer thereby to cause an increase in pressure and deliver high pressure fluid externally, while simultaneously transferring a second quantity of hot fluid from a third enclosed space to a fourth enclosed space and cooling said fluid during transfer thereby to cause a decrease in fluid pressure and to deliver cold low-pressure fluid into said fourth space; and (*b*) transferring said cold low-pressure fluid in said fourth enclosed space to said third enclosed space and heating said fluid during transfer thereby to cause an increase in pressure and to deliver high-pressure fluid externally, while simultaneously transferring hot fluid from said second enclosed space to said first enclosed space and cooling said fluid during transfer thereby to cause a decrease in fluid pressure and to deliver cold low-pressure fluid into said first space preparatory for step (*a*);

said heating in steps (*a*) and (*b*) comprising in order the steps of rejecting heat to an external heat transfer fluid, exchanging heat with that previously stored during transfer of said hot fluid, and receiving heat from an external heat transfer fluid; said cooling in steps (*a*) and (*b*) comprising in order the steps of exchanging heat with an external heat transfer fluid, storing the heat thus acquired for heat exchange with said cold fluid during its transfer, and rejecting heat to an external heat transfer fluid;

said first and fourth spaces forming a single cold zone, the total volume of which remains constant, the volume of each of said first and fourth spaces varying during the cycle from essentially zero to the total volume of said cold zone; and said second and third spaces forming a single hot zone, the total volume of which remains constant, the volume of each of said second and third spaces varying during the cycle from essentially zero to the total volume of said hot zone.

10. Apparatus for employing a fluid circulating within it, comprising in combination (*a*) a first chamber;

(*b*) a second chamber;

(*c*) first and second mechanically connected pistons operable within said first and second chambers, respectively, and adapted to divide each of said chambers into upper and lower subchambers of variable volumes;

(*d*) a first conduit communicating between the lower subchamber of said first chamber and the upper subchamber of said second chamber;

(*e*) a second conduit communicating between the upper subchamber of said first chamber and the lower subchamber of said second chamber;

(*f*) first and second heat exchange means associated with said first and second conduits respectively and adapted to deliver hot fluid into said second chamber and cold fluid into said first chamber each of said heat exchange means comprising means for rejecting heat to an outside heat transfer fluid, means for storing heat, and means for receiving heat from an outside heat transfer fluid; and (*g*) means for delivering energy externally.

11. Apparatus in accordance with claim 10 wherein said means for rejecting heat and means for receiving heat from outside sources are common to said first and second conduits.

12. Apparatus in accordance with claim 10 wherein said first conduit is the central portion of said means for storing heat in said first heat exchange means.

13. Apparatus in accordance with claim 10 wherein said means for delivering external energy comprises means for delivering work energy and said apparatus is a heat engine.

14. Apparatus in accordance with claim 10 wherein said means for delivering external energy comprises means for delivering fluid under pressure and said apparatus is a thermal compressor.

15. Apparatus for employing a fluid circulating within it, comprising in combination (*a*) a first chamber;

(*b*) a second chamber;

(*c*) first and second mechanically connected pistons operable within said first and second chambers, respectively, and adapted to divide each of said chambers into upper and lower subchambers of variable volumes;

(*d*) a first conduit communicating between the lower subchamber of said first chamber and the upper subchamber of said second chamber;

(*e*) a second conduit communicating between the upper subchamber of said first chamber and the lower subchamber of said second chamber;

(*f*) first and second heat exchange means associated with said first and second conduits, respectively, adapted to deliver hot fluid into said second chamber and cold fluid into said first chamber each of said heat exchange means comprising means for rejecting heat to an outside heat transfer fluid, means for storing heat, and means for receiving heat from an outside heat transfer fluid; and (*g*) means from supplying energy from an external source whereby said apparatus is a refrigerator.

16. Apparatus for employing a fluid circulating within it, comprising in combination (*a*) a first cold chamber;

(*b*) a second cold chamber;

(*c*) a hot chamber;

(*d*) first, second and third mechanically connected pistons operable within said first and second cold chambers and said hot chamber, respectively, and adapted to divide said first cold chamber and said hot chamber into upper and lower subchambers and said second cold chamber into two subchambers, said subchambers being of variable volumes;

(*e*) a first conduit communicating between the lower subchamber of said first cold chamber, a subchamber of said second cold chamber, and the upper subchamber of said hot chamber;

(*f*) a second conduit communicating between the upper subchamber of said first cold chamber, the other subchamber of said second cold chamber, and the lower subchamber of said hot chamber;

(*g*) first and second heat exchange means associated with said first and second conduits, respectively, adapted to heat fluids during transfer from said cold chambers to said hot chamber, and to cool fluids during transfer from said hot chamber to said cold chambers and comprising means for rejecting heat to an outside heat transfer fluid, means for storing heat, and means for receiving heat from an outside heat transfer fluid; and (*h*) means for delivering energy externally.

17. Apparatus in accordance with claim 16 including a fluid ballast, the volume of which is large compared with that of said chambers, in communication with the subchambers of said cold chambers, and adapted to control the pressure of fluids within said apparatus.

18. Apparatus for employing a fluid circulating within it, comprising in combination (*a*) a first hot chamber;

(*b*) a second hot chamber;

(*c*) a cold chamber;

(*d*) first, second and third mechanically connected pistons operable within said first and second hot chambers and said cold chamber, respectively, and adapted to divide said first hot chamber and said cold chamber into upper and lower subchambers and said second hot chamber into two subchambers, said subchambers being of variable volumes;

(*e*) a first conduit communicating between the lower subchamber of said first hot chamber, a subchamber of said second hot chamber, and the upper subchamber of said cold chamber;

(*f*) a second conduit communicating between the upper subchamber of said first hot chamber, the other subchamber of said second hot chamber, and the lower subchamber of said cold chamber;

(*g*) first and second heat exchange means associated with said first and second conduits, respectively, and comprising means for rejecting heat to an outside heat transfer fluid, means for storing heat, and means for receiving heat from an outside heat transfer fluid; and (*h*) means for supplying energy from an external source whereby said apparatus is a refrigerator.

References Cited in the file of this patent

UNITED STATES PATENTS

| | | |
|---|---|---|
| 1,603,779 | Koenig | Oct. 19, 1926 |
| 2,484,392 | Van Heeckeren | Oct. 11, 1949 |
| 2,558,481 | Dros | June 26, 1951 |
| 2,616,245 | Van Weenen | Nov. 4, 1952 |
| 2,657,553 | Jonkers | Nov. 3, 1953 |
| 2,907,175 | Kohler | Oct. 6, 1959 |